US008315239B2

(12) United States Patent
Kim et al.

(10) Patent No.: US 8,315,239 B2
(45) Date of Patent: Nov. 20, 2012

(54) APPARATUS AND METHOD FOR ALLOCATING RESOURCE IN BROADBAND WIRELESS COMMUNICATION SYSTEM

(75) Inventors: Nam-Gi Kim, Suwon-si (KR); Jae-Hee Cho, Seoul (KR); Jung-Je Son, Seongnam-si (KR); Min-Hee Cho, Suwon-si (KR); Jae-Hyuk Jang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1339 days.

(21) Appl. No.: 11/835,857

(22) Filed: Aug. 8, 2007

(65) Prior Publication Data

US 2008/0037505 A1 Feb. 14, 2008

(30) Foreign Application Priority Data

Aug. 8, 2006 (KR) .............................. 2006-0074484

(51) Int. Cl.
*H04J 1/00* (2006.01)
(52) U.S. Cl. ..................................... 370/343; 455/452.1
(58) Field of Classification Search .................. None
See application file for complete search history.

(56) References Cited

U.S. PATENT DOCUMENTS

| 6,064,662 A * | 5/2000 | Gitlin et al. .................... 370/330 |
| 6,567,482 B1 * | 5/2003 | Popovic' ....................... 375/343 |
| 7,039,092 B1 * | 5/2006 | Cao et al. ....................... 375/140 |
| 7,496,067 B2 * | 2/2009 | Qiu et al. ....................... 370/329 |
| 7,751,364 B2 * | 7/2010 | Won et al. ...................... 370/329 |
| 2003/0118046 A1 * | 6/2003 | Chao ............................. 370/442 |
| 2004/0131008 A1 * | 7/2004 | Zuniga et al. ................. 370/208 |
| 2007/0274288 A1 * | 11/2007 | Smith et al. ................... 370/351 |
| 2008/0020778 A1 * | 1/2008 | Pi ................................. 455/450 |
| 2008/0031191 A1 * | 2/2008 | Kashima et al. .............. 370/329 |
| 2008/0049697 A1 * | 2/2008 | Breuer et al. ................. 370/341 |
| 2008/0304588 A1 * | 12/2008 | Pi ................................. 375/260 |

FOREIGN PATENT DOCUMENTS

| KR | 1020010077334 | 8/2001 |
| WO | WO 2006/062729 | 6/2006 |
| WO | WO 2006062729 A2 * | 6/2006 |
| WO | WO 2006/085800 | 8/2006 |
| WO | WO 2006085800 A1 * | 8/2006 |

* cited by examiner

*Primary Examiner* — Chi Pham
*Assistant Examiner* — Kouroush Mohebbi
(74) *Attorney, Agent, or Firm* — The Farrell Law Firm, P.C.

(57) ABSTRACT

Provided is an apparatus and method for allocating radio resources in a broadband wireless communication system by adaptively grouping the radio resources. In the method, the amount of resources necessary for a transmission of data to a user terminal and the amount of the remaining allocable resources are detected. A resource allocation scheme is selected in consideration of the amount of resources necessary for the transmission of the data to the user terminal and the amount of the remaining resources. A group index of radio resources for the user terminal is determined according to the selected resource allocation scheme. Radio resources corresponding to the determined group index are allocated to the user terminal.

15 Claims, 6 Drawing Sheets

APPARATUS AND METHOD FOR ALLOCATING RESOURCE IN BROADBAND WIRELESS COMMUNICATION SYSTEM

PRIORITY

This application claims priority under 35 U.S.C. §119(a) to an application filed in the Korean Intellectual Property Office on Aug. 8, 2006 and assigned Serial No. 2006-0074484, the contents of which are incorporated herein by reference.

BACKGROUND OF THE INVENTION

1. Field of the Invention

The present invention relates generally to a broadband wireless communication system, and in particular, to an apparatus and method for allocating radio resources in a broadband wireless communication system by adaptively grouping the radio resources.

2. Description of the Related Art

Extensive research is being conducted to develop adaptive radio resource allocation schemes for efficiently using limited radio resources in a broadband wireless communication system. For example, a wireless communication system based on the Institute of Electrical and Electronics Engineers (IEEE) 802.16 standard allocates radio resources to user terminals using time-frequency resources, as illustrated in FIG. 1.

FIG. 1 is a diagram illustrating a conventional resource allocation architecture in a wireless communication system.

As illustrated in FIG. 1, the wireless communication system allocates radio resources using a location/size resource allocation scheme. For a DownLink (DL), the wireless communication system allocates radio resources in a two-dimensional fashion in consideration of time and frequency axes. For an UpLink (UL), the wireless communication system allocates radio resources according to resource lengths in a one-dimensional fashion in consideration of only the time axis (in a layered fashion along the frequency axis).

At this point, using a map, the wireless communication system provides each user terminal with radio resource allocation information (the size and start position of radio resources).

For the uplink, the map contains two-dimensional location/size resource allocation information including the length and the start point of the frequency axis and the length and the start point of the time axis. For the downlink, the map contains one-dimensional location/size resource allocation information including the length and the start point of the time axis.

As described above, the wireless communication system allocates radio resources using a two-dimensional resource allocation scheme and a one-dimensional resource allocation scheme. When the wireless communication system uses the two-dimensional resource allocation scheme, the wireless communication system allocates radio resources in consideration of both the time axis and the frequency axis, which increases the freedom of radio resource allocation for the respective user terminals. However, when the wireless communication system uses the two-dimensional resource allocation scheme, there is an increase in the size of a map for a transmission of resource allocation information to the respective user terminals.

When the wireless communication system uses the one-dimensional resource allocation scheme, the wireless communication system allocates radio resources in consideration of only the time axis, which reduces the map size. However, when the wireless communication system uses the one-dimensional resource allocation scheme, the start point of each burst is not fixed but changes for each frame.

When the wireless communication system uses the two-dimensional resource allocation scheme, the resource allocation information increases. When the wireless communication system uses the one-dimensional resource allocation scheme, the time point is not fixed. The wireless communication system may use a tree allocation scheme in order to solve the above problems.

FIG. 2 is a diagram illustrating a conventional tree allocation scheme in the wireless communication system.

When a tree allocation scheme is used as illustrated in FIG. 2, the wireless communication system constructs a tree of all radio resources using $2^n$-sized tree nodes. Thereafter, the wireless communication system allocates tree nodes in the tree according to the amount of radio resources that is needed by user terminals.

For example, when the maximum resource size is $2^4$ (=16), the wireless communication system constructs a tree of all of the radio resources using 16, 8, 4 and 2-sized tree nodes. Thereafter, the wireless communication system allocates tree nodes according to the amount of radio resources that is needed by user terminals. If a user terminal needs 4 radio resources, the wireless communication system allocates a treed node 5 to the user terminal. In this case, the user terminal is actually allocated $9^{th}$ through $12^{th}$ radio resources.

As described above, the wireless communication system constructs a tree of all of the radio resources using $2^n$-sized tree nodes and allocates radio resources in units of the tree node. Therefore, when radio resource allocation information needs to be transmitted in a wireless communication system using the tree allocation scheme, the wireless communication system has only to provide tree node IDentifications (IDs) allocated to user terminals. Thus, when the maximum radio resource size is $2^R$, the wireless communication system needs only an (R+1)-bit address space for indicating radio resource allocation information. Accordingly, it is possible to reduce the size of a map for a transmission of resource allocation information.

In addition, when the wireless communication system uses the tree allocation scheme, the start position of radio resources is fixed and thus periodic resource allocation can be performed on the respective user terminals.

However, when the wireless communication system uses the tree allocation scheme, it allocates radio resources in units of the $2^n$-sized tree node, causing a waste of the radio resources i.e., because the size of allocated radio resources is fixed in units of the tree node, the wireless communication system may allocate more radio resources than are needed by user terminals. For example, when the wireless communication system uses the tree allocation scheme illustrated in FIG. 2, it allocates a 4 (=$2^2$)-sized tree node to a user terminal that needs 3 radio resources i.e., the wireless communication system wastes one radio resource. When a user terminal needs 9 radio resources, the wireless communication system allocates a 16 (=$2^4$)-sized tree node to the user terminal, i.e., the wireless communication system wastes 7 radio resources.

Moreover, when the wireless communication system uses the tree allocation scheme, the start position of allocable resources is very restrictive. Therefore, when the allocation and elimination of radio resources are repeated in the wireless communication system, there occurs a serious resource segmentation problem where a large-sized resource cannot be allocated due to the scattering of available radio resources.

SUMMARY OF THE INVENTION

An object of the present invention is to substantially solve at least the above problems and/or disadvantages and to provide at least the advantages below. Accordingly, an object of the present invention is to provide an apparatus and method for allocating radio resources in a broadband wireless communication system by adaptively grouping the radio resources.

Another object of the present invention is to provide an apparatus and method for allocating radio resources in a broadband wireless communication system, which can reduce the loss of the radio resources and can adaptively provide an allocation start position.

Still another object of the present invention is to provide an apparatus and method for allocating radio resources in a broadband wireless communication system by adaptively grouping the radio resources, which can diversify the allocation unit and allocation start position of the radio resources.

According to one aspect of the present invention, an apparatus for allocating radio resources in a wireless communication system includes a scheduler for selecting a resource allocation scheme in consideration of an amount of resources necessary for a transmission of data to a user terminal and an amount of the remaining resources, and determining a group index of radio resources for the user terminal according to the selected resource allocation scheme; and a resource allocator for allocating radio resources corresponding to the determined group index to the user terminal.

According to another aspect of the present invention, a method for allocating radio resources in a wireless communication system includes detecting the amount of resources necessary for a transmission of data to a user terminal and an amount of the remaining resources; selecting a resource allocation scheme in consideration of an amount of resources necessary for the transmission of the data to the user terminal and the amount of the remaining resources; determining a group index of radio resources for the user terminal according to the selected resource allocation scheme; and allocating radio resources corresponding to the determined group index to the user terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for allocating radio resources in a wireless communication system by adaptively grouping the radio resources, i.e., the present invention provides an apparatus and method for adaptively allocating radio resources by diversifying the allocation unit and allocation position of the radio resources in a wireless communication system that groups and allocates the radio resources.

A wireless communication system based on an Orthogonal Frequency Division Multiple Access (OFDMA) scheme is exemplified in the following description. However, the present invention can also be applied to wireless communication systems based on other multiple access schemes.

For example, a tree allocation scheme and a Coarsely Full Allocation (CFA) scheme are used to group and allocate radio resources in the wireless communication system. However, the present invention can also be applied when other allocation schemes are used to group and allocate the radio resources. The CFA scheme allocates radio resources by dividing the radio resources in fixed allocation units and giving an offset (a resource allocation start index) and a resource length index to each user terminal.

Figure 1:
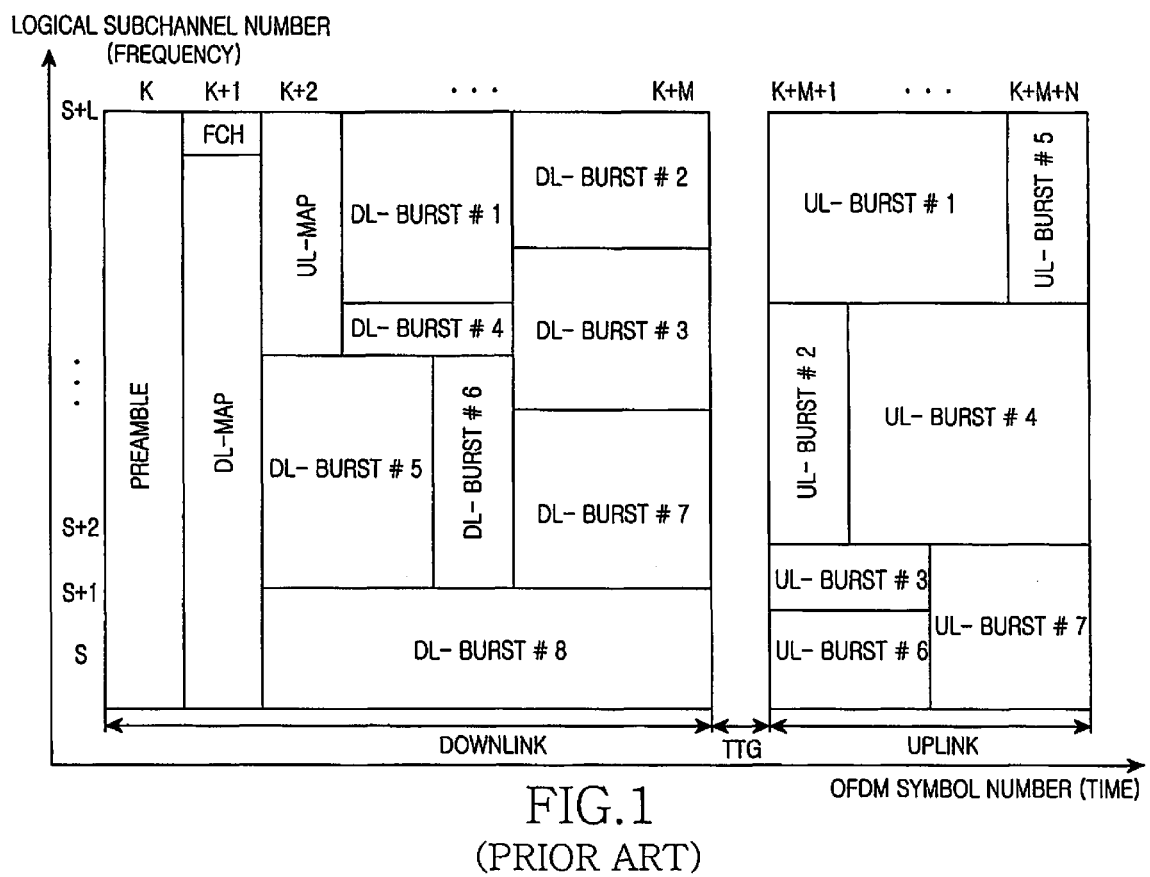
FIG. 1 is a diagram illustrating a conventional resource allocation architecture in a wireless communication system.
Figure 2:
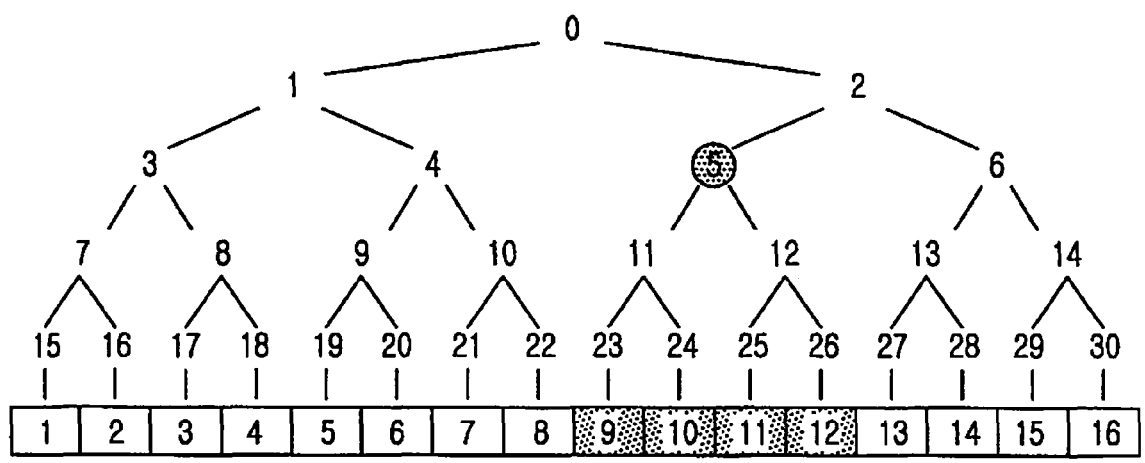
FIG. 2 is a diagram illustrating a conventional tree allocation scheme in a wireless communication system.
Figure 3:
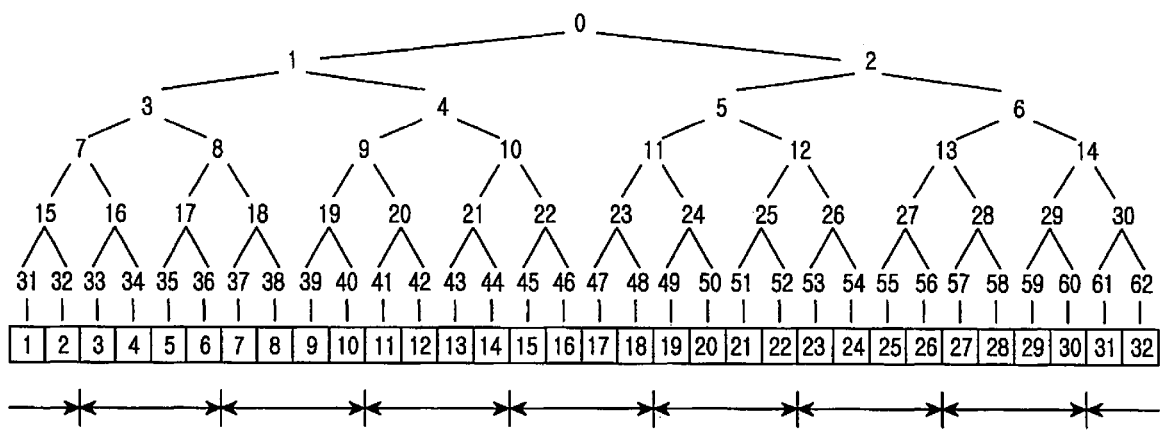
FIG. 3 is a diagram illustrating a radio resource allocation scheme according to an embodiment of the present invention.

FIG. 3 is a diagram illustrating a radio resource allocation scheme according to an embodiment of the present invention. The following description will be made assuming that a base station allocates radio resources in the wireless communication system.

Referring to FIG. 3, the base station allocates radio resources using both a tree allocation scheme and a CFA scheme.

When the tree allocation scheme is used for radio resource allocation, the base station constructs a tree of all of the radio resources (e.g., 32 ($2^5$)) using $2^n$ ($2^5$, $2^4$, $2^3$, $2^2$, and $2^1$)-sized tree nodes. The base station allocates radio resources using the tree nodes according to the amount of radio resources needed by user terminals.

When the CFA scheme is used for radio resource allocation, the base station groups all of the radio resources (e.g., 32 ($2^5$)) in the same size (e.g., 4). The base station allocates radio resources using a group start index and a resource length index according to the amount of radio resources needed by user terminals.

When the tree allocation scheme and the CFA scheme are used for radio resource allocation, the base station selects one of the two allocation schemes according to a scheduling scheme and allocates radio resources to each user terminal using the selected allocation scheme. For example, the base station selects one of the two allocation schemes according to the amount of allocable radio resources and allocates radio resources to each user terminal using the selected allocation scheme.

After allocation of radio resources using the tree allocation scheme and the CFA scheme, the base station transmits the radio resource allocation information to the respective user terminals. When radio resources are allocated using the tree allocation scheme, the base station transmits to user terminals the radio resource allocation information expressed as Equation (1):

$$TA => AllocType + TreeNodeID \quad (1)$$

where TA denotes a tree allocation scheme, AllocType denotes the type of the radio resource allocation scheme, and TreeNode ID denotes an IDentification (ID) of a tree node to be allocated to a user terminal.

Because the radio resource allocation information is constructed as Equation (1), the base station can transmit the radio resource allocation information using (R+2) bits, i.e., when the size of all of the radio resources is $2^R$, the radio resource allocation information needs 1 bit for representing the tree allocation scheme and (R+1) bits for representing all of the tree nodes. Accordingly, the base station needs (R+2) bits for transmitting the radio resource allocation information using the tree allocation scheme.

When the CFA scheme is used for radio resource allocation, the base station to user terminals the radio resource allocation information expressed as Equation (2):

$$CFA => \text{AllocType} + \text{Offset} + \text{Length} \quad (2)$$

where AllocType denotes that radio resources are allocated using a CFA scheme, Offset denotes a group start index of resources allocated to a user terminal, and Length denotes a length index of the resources allocated to the user terminal.

The radio resource allocation information of the CFA scheme has the same size as the radio resource allocation information of the tree allocation scheme. For example, in the case of the radio resource allocation information expressed as Equation (2), the base station uses 1 bit of (R+2) bits to represent the CFA scheme and uses the remaining (R+1) bits to represent the offset and the length index. The bits allocated to represent the offset and the length index may vary with the size of radio resources for grouping all of the radio resources. If R is 5, all of the radio resources of the wireless communication system have a size of $2^5$ (=32). If each of the offset and the length index is represented using 3 bits, the base station groups all of the radio resources into 8 groups each including 4 radio resources. For example, when the base station transmits CFA-based radio resource allocation information, which has an offset of 1 and a length index of 2, to a user terminal, the user terminal detects that it has been allocated a total of eight radio resources, i.e., seventh to fourteenth radio resources.

When the base station transmits CFA-based radio resource allocation information, which has an offset of 7 and a length index of 1, to a user terminal, the user terminal detects that it has been allocated $31^{st}$, $32^{nd}$, first and second radio resources.

If the offset is represented using 2 bits and the length index is represented using 4 bits, the base station groups all of the radio resources into 8 groups each including 4 radio resources.

As described above, the base station of the wireless communication system can allocate adaptively-grouped radio resources to user terminals using the tree allocation scheme and the CFA scheme that groups all of the radio resources in the same size. In another embodiment, the base station of the wireless communication system can allocate adaptively-grouped radio resources to user terminals using the tree allocation scheme and the CFA scheme that groups all of the radio resources non-uniformly.

Figure 4:
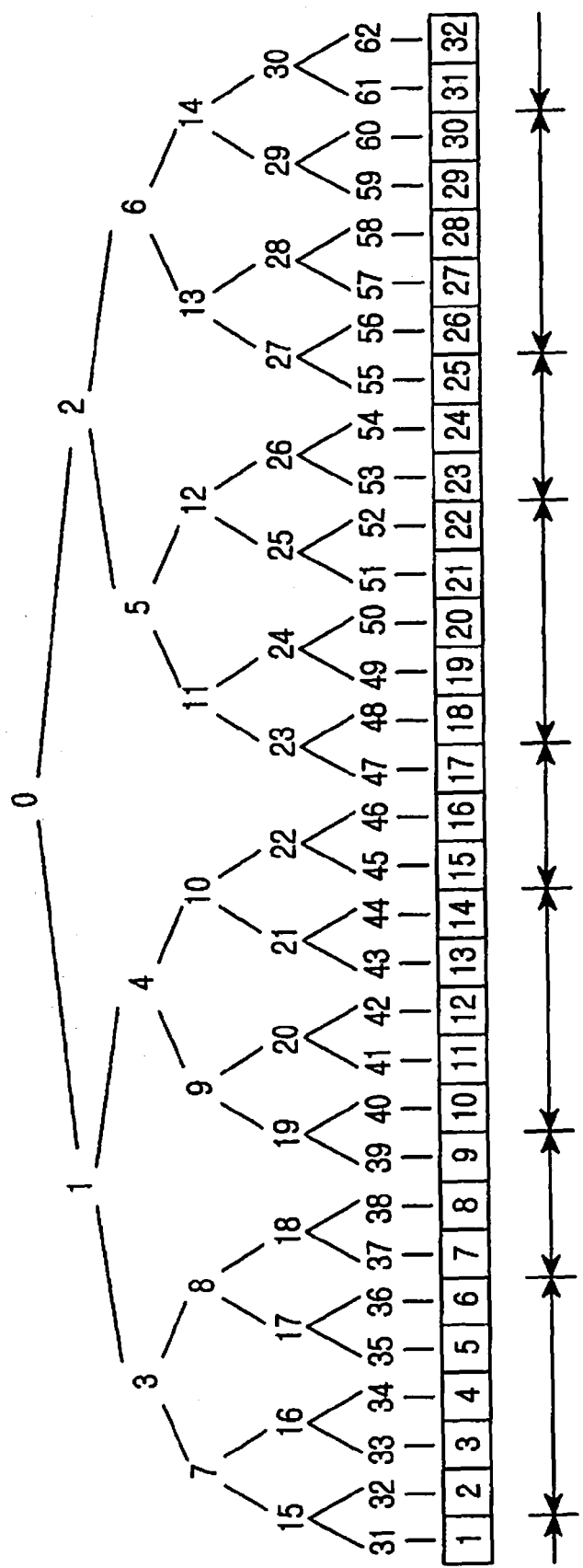
FIG. 4 is a diagram illustrating a radio resource allocation scheme according to another embodiment of the present invention.

FIG. 4 is a diagram illustrating a radio resource allocation scheme according to another embodiment of the present invention.

Referring to FIG. 4, the base station of the wireless communication system allocates radio resources using a tree allocation scheme and a non-uniform CFA scheme. The case where the base station uses the tree allocation scheme is the same as in FIG. 3 and thus a detailed description of this case is not provided herein.

When the non-uniform CFA scheme is used for radio resource allocation, the base station groups all of the radio resources (e.g., 32 ($2^5$)) into groups having different sizes.

For example, the base station groups all of the radio resources into a group with a radio resource size of 5 and a group with a radio resource size of 3.

At this point, the base station allocates radio resources using a group start index and a resource length index according to the amount of radio resources needed by user terminals.

The radio resource allocation information of the non-uniform CFA scheme has the same size as the radio resource allocation information of the tree allocation scheme. For example, the base station uses 1 bit of (R+2) bits to represent the CFA scheme and uses the remaining (R+1) bits to represent the offset and the length index.

The bits allocated to represent the offset and the length index may vary with the size of radio resources for grouping all of the radio resources. If R is 5, all of the radio resources of the wireless communication system have a size of $2^5$ (=32). If each of the offset and the length index is represented using 3 bits, the base station groups all of the radio resources into 8 groups. At this point, all of the radio resources may be non-uniformly grouped into a group having 5 radio resources and a group having 3 radio resources.

For example, when the base station transmits CFA-based radio resource allocation information, which has an offset of 1 and a length index of 1, to a user terminal, the user terminal detects that it has been allocated a total of three radio resources, i.e., seventh to ninth radio resources.

When the base station transmits CFA-based radio resource allocation information, which has an offset of 7 and a length index of 1, to a user terminal, the user terminal detects that it has been allocated $31^{st}$, $32^{nd}$ and first radio resources.

Figure 5:
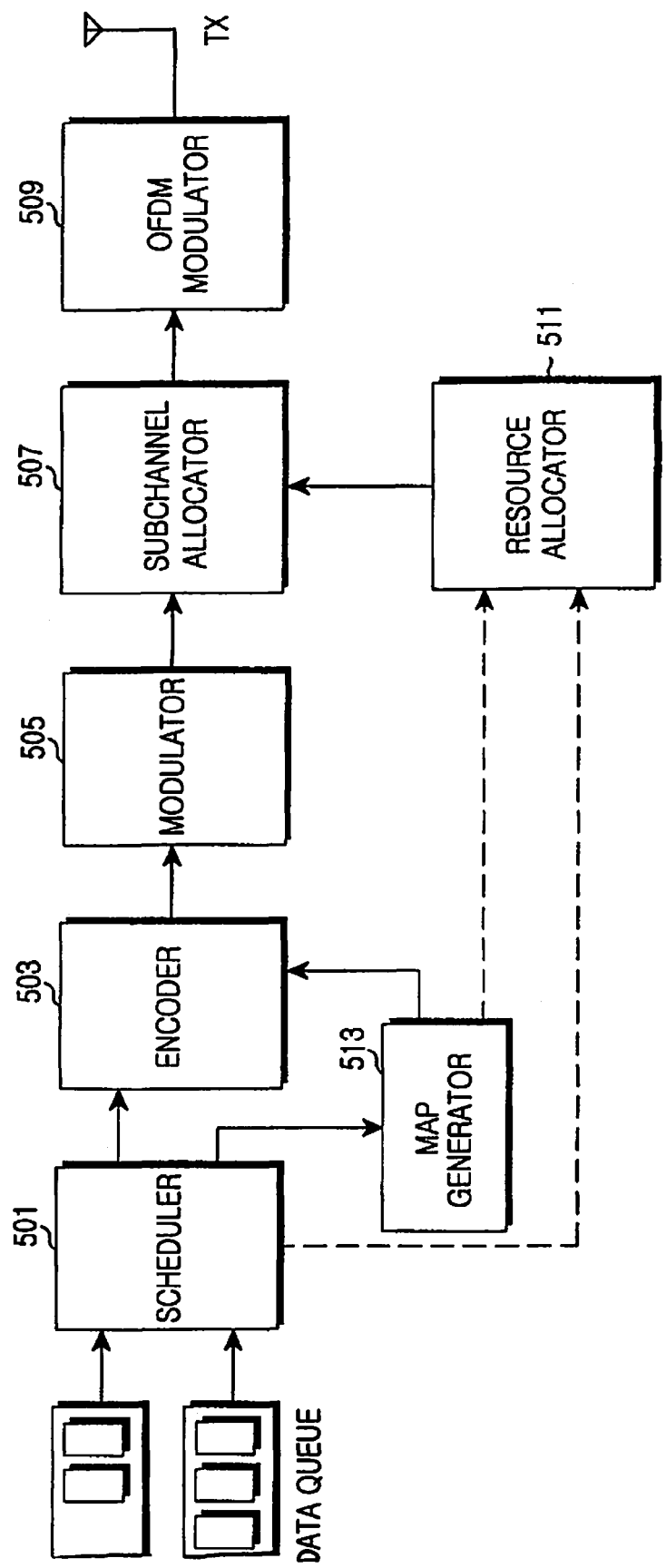
FIG. 5 is a block diagram of a resource allocation apparatus in a broadband wireless communication system according to the present invention.

FIG. 5 is a block diagram of a resource allocation apparatus in a broadband wireless communication system according to the present invention. The following description will be made assuming that a base station allocates radio resources to each user terminals Referring to FIG. 5, the base station includes a scheduler 501, an encoder 503, a modulator 505, a subchannel allocator 507, an Orthogonal Frequency Division Multiplexing (OFDM) modulator 509, a resource allocator 511, and a map generator 513.

The scheduler 501 detects the size of the remaining allocable radio resources and the size of data received from data queues. Thereafter, the scheduler 501 selects a radio resource allocation scheme according to the data size and the radio resource size, and allocates radio resources according to the corresponding radio resource allocation scheme. For example, if a tree allocation scheme is used for radio resource allocation, the scheduler 501 determines a tree node for transmitting data to each of user terminals. If a CFA scheme is used for radio resource allocation, the scheduler 501 determines an offset and a length index of radio resources for transmitting data to each of user terminals.

Thereafter, the scheduler 501 transmits the radio resource allocation information of the determined data to the resource allocator 511 and the map generator 513.

Using the radio resource allocation information received from the scheduler 501, the map generator 513 generates map information for transmitting the data i.e., the map generator 513 generates map information using Equation (1) or Equation (2) according to the radio resource allocation type included in the radio resource allocation information.

The encoder 503 encodes the data received from the scheduler 501 and the map information received from the map generator 513, in according to a predetermined modulation level (e.g., a predetermined Modulation and Coding Scheme (MCS) level). The modulator 505 modulates the encoded data received from the encoder 503, according to a predetermined modulation level.

According to the resource allocation information received from the resource allocator 511, the subchannel allocator 507 maps the data received from the modulator 505 to a radio resource (a subchannel). For example, when a resource allocation scheme illustrated in FIG. 3 is used, if a tree allocation scheme is used in the resource allocator 511 and a tree node ID is 21, the subchannel allocator allocates 507 $13^{th}$ and $14^{th}$ radio resources to data. If a CFA scheme is used in the resource allocator 511, an offset is 2 and a length index is 1, the subchannel allocator 507 allocates $11^{th}$ to $14^{th}$ radio resources to data.

The resource allocator 511 controls the subchannel allocator 507 to allocate radio resources using the radio resource allocation information for transmission (hereinafter, "TX") data and the resource allocation information for allocation of the map information, which are received from the scheduler 501 and the map generator 513.

Figure 6:
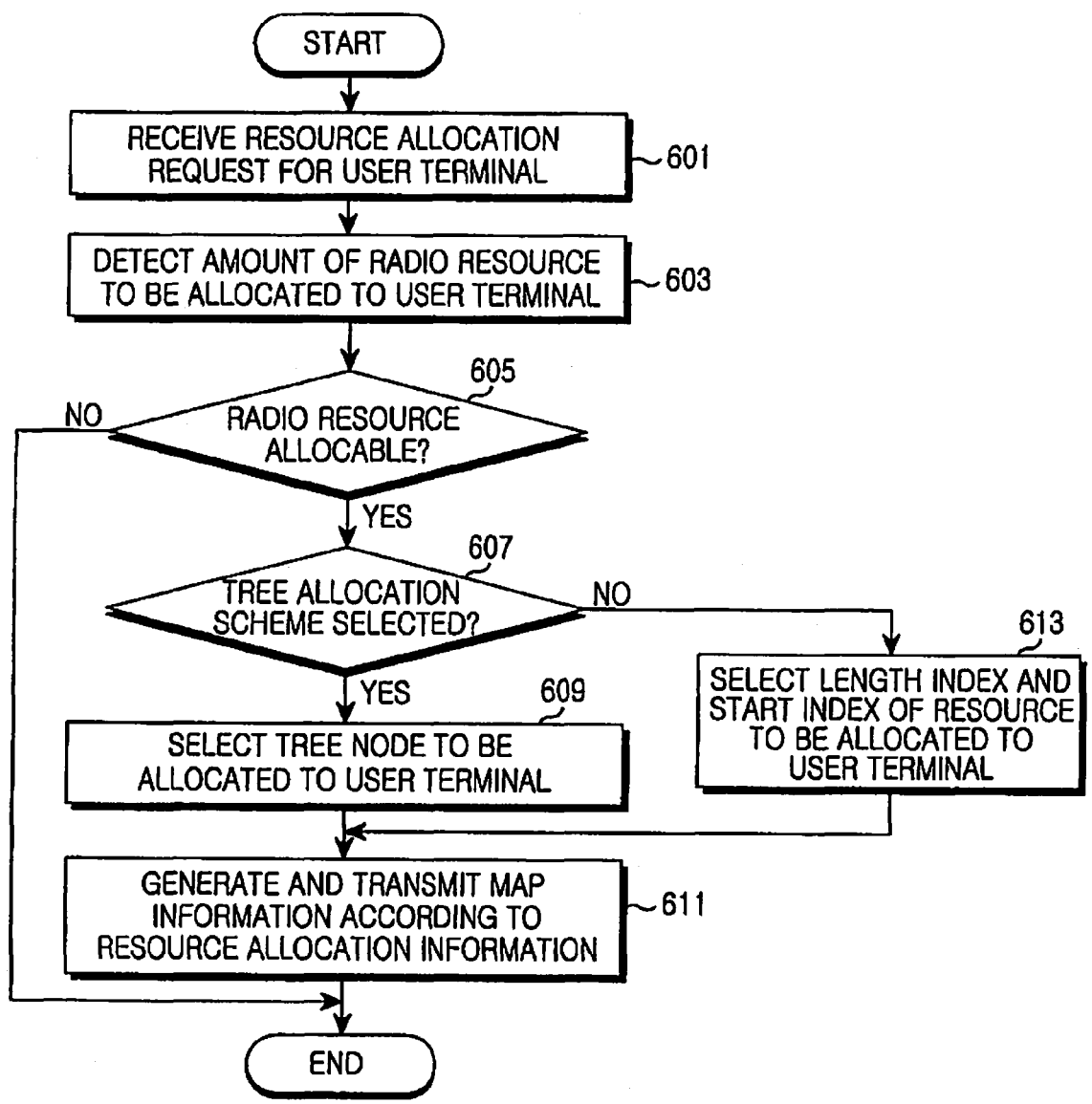
FIG. 6 is a flowchart illustrating a radio resource allocation procedure according to an embodiment of the present invention.

FIG. 6 is a flowchart illustrating a radio resource allocation procedure according to an embodiment of the present invention.

Referring to FIG. 6, the base station determines whether a resource allocation request for a user terminal is received, in step 601.

If the resource allocation request is received, in step 601, the base station detects the amount of radio resources to be allocated to the user terminal, in step 603, i.e., the base station detects the amount of radio resources that is needed to transmit data to the user terminal.

In step 605, the base station detects the amount of the remaining radio resources allocable to the user terminal to determine whether radio resources can be allocated to the user terminal.

If the radio resources to be allocated to the user terminal are insufficient, in step 605, the base station ends the radio resource allocation procedure.

On the other hand, if the radio resources can be allocated to the user terminal, in step 605, the base station determines a radio resource allocation scheme for allocating radio resources to the user terminal, in step 607, i.e., the base station selects one of the tree allocation scheme and the CFA scheme as the radio resource allocation scheme according to the amount of radio resources to be allocated to the user terminal and the amount of the remaining radio resources.

If the tree allocation scheme is selected as the radio resource allocation scheme, in step 607, the base station selects a tree node in consideration of the position and the amount of radio resources to be allocated to the user terminal, in step 609.

In step 611, the base station generates map information including radio resource allocation information (i.e., tree node information) allocated to the user terminal.

On the other hand, if the tree allocation scheme is not selected as the radio resource allocation scheme, in step 607, the base station allocates radio resources to the user terminal using CFA scheme, in step 613. Accordingly, the base station selects an offset (a start index) and a length index of a radio resource group to be allocated to the user terminal.

In step 611, the base station generates map information including the radio resource allocation information (i.e., the offset and the length index) and transmits the generated map information to the user terminal.

Thereafter, the base station ends the radio resource allocation procedure.

As described above, the present invention diversifies the allocation unit and the allocation start position of the radio resources in the wireless communication system that groups and adaptively allocates the radio resources. The radio resource allocation information and a loss of the radio resources due to the allocation unit can be reduced by diversifying the resource allocation unit. Also, an inefficiency in the use of the radio resources due to resource segmentation can be prevented by diversifying the resource allocation start position.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for allocating radio resources in a wireless communication system, the apparatus comprising:
    a scheduler for selecting one of at least two resource allocation schemes in consideration of an amount of resources necessary for a transmission of data to a user terminal and an amount of the remaining resources, and determining a group index of radio resources for the user terminal according to the selected resource allocation scheme;
    a resource allocator for allocating radio resources corresponding to the determined group index to the user terminal; and
    a resource allocation information generator for generating radio resource allocation information for transmitting radio resource information allocated to the user terminal,
    wherein the radio resource allocation information includes resource allocation scheme information and the group index, and
    wherein the at least two resource allocation schemes include a first scheme in which the base station groups all of the radio resources in a same size and allocates radio resources using a group start index and a resource length index according to an amount of radio resources needed by the user terminal, and a second scheme in which the base station constructs a tree of all of the radio resources using tree nodes and allocates radio resources using the tree nodes according to the amount of radio resources needed by the user terminal.

2. The apparatus of claim 1, wherein the first scheme and the second scheme differ in sizes and start positions of groups for allocating radio resources to the user terminal.

3. The apparatus of claim 1, wherein the at least two resource allocation schemes further includes a third scheme for allocating radio resources by grouping all of the radio resources into groups having different sizes.

4. The apparatus of claim 1, wherein if the second scheme is selected, the scheduler determines a tree node to be allocated to the user terminal, in consideration of the amount of resources necessary for the transmission of the data to the user terminal and the amount of the remaining resources.

5. The apparatus of claim 1, wherein if the first scheme is selected, the scheduler determines a start index of a group to be allocated to the user terminal and a length index of radio resources to be allocated to the user terminal, in consideration of the amount of resources necessary for the transmission of the data to the user terminal and the amount of the remaining resources.

6. The apparatus of claim 1, wherein if the second scheme is selected, the resource allocation information generator generates the radio resource allocation information including the tree allocation scheme information and a tree node IDentification (ID).

7. The apparatus of claim 1, wherein if the first scheme is selected, the resource allocation information generator generates the radio resource allocation information including the radio resource allocation scheme information, a length index and a start index of a group allocated to the user terminal.

8. A method for allocating radio resources in a wireless communication system, the method comprising the steps of:
    detecting an amount of resources necessary for a transmission of data to a user terminal and an amount of the remaining allocable resources;
    selecting a resource allocation scheme in consideration of the amount of resources necessary for the transmission of the data to the user terminal and the amount of the remaining resources;
    determining a group index of radio resources for the user terminal according to the selected resource allocation scheme;
    allocating radio resources corresponding to the determined group index to the user terminal;
    generating radio resource allocation information, including the selected resource allocation scheme and group index information, for allocation to the user terminal; and
    transmitting the generated radio resource allocation information to the user terminal;
    wherein the resource allocation scheme is one of at least a first scheme in which a base station groups all of the radio resources in a same size and allocates radio resources using a group start index and a resource length index according to an amount of radio resources needed by the user terminal, and a second scheme in which the base station constructs a tree of all of the radio resources using tree nodes and allocates radio resources using the tree nodes according to the amount of radio resources needed by the user terminal.

9. The method of claim 8, wherein the first scheme and the second scheme differ in sizes and start positions of groups for allocating radio resources to the user terminal.

10. The method of claim 8, wherein the resource allocation scheme further includes a third resource allocation scheme for allocating radio resources by grouping all of the radio resources into groups having different sizes.

11. A method for allocating radio resources in a wireless communication system, the method comprising the steps of:
    detecting an amount of radio resources necessary for a transmission of data to a user terminal and an amount of the remaining allocable resources;
    selecting a resource allocation scheme in consideration of the amount of radio resources necessary for the transmission of the data and the amount of the remaining resources;
    allocating radio resources corresponding to the selected resource allocation scheme to the user terminal;
    generating radio resource allocation information including the selected resource allocation scheme and radio resource information allocated to the user terminal; and
    transmitting the generated radio resource allocation information to the user terminal, wherein the resource allocation scheme is one of at least a first scheme in which a base station groups all of the radio resources in a same size and allocates radio resources using a group start index and a resource length index according to an amount of radio resources needed by the user terminal, and a second scheme in which the base station constructs a tree of all of the radio resources using tree nodes and allocates radio resources using the tree nodes according to the amount of radio resources needed by the user terminal.

12. The method of claim 11, wherein the tree node is selected in consideration of the amount of radio resources necessary for the transmission of the data and the amount of the remaining resources.

13. The method of claim 11, further comprising, if the first scheme is selected, determining a start index of a group to be allocated to the user terminal and a length index of radio resources to be allocated to the user terminal; and
    allocating radio resources corresponding to the start index and the length index to the user terminal.

14. The method of claim 13, wherein the start index and the length index are selected in consideration of the amount of radio resources necessary for the transmission of the data and the amount of the remaining resources.

15. The method of claim 11, wherein if the resource allocation scheme is a scheme that allocates radio resources by grouping all of the radio resources into groups having the same size or different sizes, the radio resource allocation information includes the radio resource allocation scheme information, a length index and a start index of a group allocated to the user terminal.

* * * * *